(12) United States Patent
Quast et al.

(10) Patent No.: US 9,479,706 B2
(45) Date of Patent: Oct. 25, 2016

(54) BRIGHTNESS ADJUSTMENT SYSTEM (71) Applicant: Harman Becker Automotive Systems GmbH, Karlsbad (DE)

(72) Inventors: Johannes Quast, Karlsbad (DE); Kay-Ulrich Scholl, Karlsbad (DE); Bernd Gassmann, Straubenhardt (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 73 days.

(21) Appl. No.: 13/766,569

(22) Filed: Feb. 13, 2013

(65) Prior Publication Data

US 2013/0208140 A1    Aug. 15, 2013

(30) Foreign Application Priority Data

Feb. 15, 2012 (EP) .................................... 12155650

(51) Int. Cl.
| | |
|---|---|
| *H04N 5/235* | (2006.01) |
| *H04N 5/232* | (2006.01) |
| *H04N 5/247* | (2006.01) |

(52) U.S. Cl.
CPC ........ *H04N 5/2353* (2013.01); *H04N 5/23203* (2013.01); *H04N 5/23238* (2013.01); *H04N 5/247* (2013.01)

(58) Field of Classification Search
CPC ............... H04N 5/235; H04N 5/2353; H04N 5/23203; H04N 5/23238; H04N 5/247
USPC ................................. 348/333.01, 229.1, 362
See application file for complete search history.

(56) References Cited

U.S. PATENT DOCUMENTS

| | | | | |
|---|---|---|---|---|
| 2001/0019363 | A1* | 9/2001 | Katta et al. | 348/333.01 |
| 2003/0122951 | A1* | 7/2003 | Hara et al. | 348/333.02 |
| 2010/0225663 | A1* | 9/2010 | Lee et al. | 345/596 |
| 2011/0150356 | A1* | 6/2011 | Jo | G06T 5/002 382/269 |

(Continued)

FOREIGN PATENT DOCUMENTS

EP    1 134 718 A2    9/2001

OTHER PUBLICATIONS

European Search Report from corresponding European Patent Application No. EP 12 15 5650, 6pgs., Mar. 3, 2012.

(Continued)

*Primary Examiner* — Nhan T Tran
*Assistant Examiner* — Chan Nguyen
(74) *Attorney, Agent, or Firm* — Alleman Hall McCoy Russell & Tuttle LLP (57) ABSTRACT

A brightness adjustment system of a surround view system may include at least two adjacent image sensors providing images covering different fields of view of a user's surroundings. A first image sensor and a second image sensor of the at least two image sensors may be configured to capture images using an adjustable exposure time. An exposure time control unit may be provided that may be configured to determine, for the at least two adjacent image sensors, one or more brightness parameters from image data provided by the image sensors. The exposure time control unit may be further configured to control the exposure times of the image sensors such that the brightness parameter(s) determined for the first image sensor at least approximately matches one or more corresponding brightness parameters determined for the second image sensor.

21 Claims, 5 Drawing Sheets

(56) References Cited

U.S. PATENT DOCUMENTS

| | | |
|---|---|---|
| 2011/0234807 A1 | 9/2011 | Jones et al. |
| 2012/0026333 A1* | 2/2012 | Okuyama ................ B60R 1/00 348/148 |
| 2012/0188373 A1* | 7/2012 | Kwon et al. .................. 348/148 |
| 2013/0142418 A1* | 6/2013 | van Zwol et al. ............ 382/159 |

OTHER PUBLICATIONS

Andrea Frome et al., Large-Scale Privacy Protection in Google Street View, 8pgs., IEEE 2009.

Doutre et al., Fast Vignetting Correction and Color Matching for Panoramic Image Stitching, 7pgs., IEEE 2009.

* cited by examiner

Figure 1

Figure 2 view D, left camera  view C, rear camera

BRIGHTNESS ADJUSTMENT SYSTEM

BACKGROUND OF THE INVENTION

1. Priority Claim

This application claims the benefit of priority from European Patent Application No. EP12155650.0, filed Feb. 15, 2012, which is incorporated by reference.

2. Technical Field

The present invention relates to brightness adjustment systems of surround view systems, in particular for the use in connection with driver assistance systems in vehicles.

3. Related Art

A vehicle may have a side-view minor and a rear-view minor to enable a driver to view the surroundings of the vehicle. However, there may be a blind spot (e.g., an area out of the driver's view) when using the minors. To minimize the area concealed by the blind spot, additional minors may be attached to the vehicle. However, even by using such additional mirrors, it may not be easy to limit the blind spot. Furthermore, in the case where an additional minor is attached to the vehicle body, the design of the vehicle may be compromised.

SUMMARY

Surround view systems may use multiple image sensors (e.g., front-view camera, rear-view camera, and left and right side-view cameras) to provide different images covering an area surrounding a vehicle. To improve the field of view of the individual image sensors the image sensors may be equipped with wide-angle lenses. The images captured by the individual image sensors may be consolidated to one overall image covering the surroundings of the vehicle. Such consolidation may be achieved using an image processing unit executing appropriate image-stitching algorithms that accomplish the image-processing task in real time to provide live images. However, the brightness of the individual images may significantly differ, particularly when the sun is shining and the vehicle casts shadows into the field of view of some of the image sensors used. In such a scenario, for example, stitching together images of different brightness may lead to a sub-optimal quality of the resulting overall image. Described herein, is a brightness adjustment system (BAS) of a surround view system that can limit the differing in brightness.

The BAS may include at least two image sensors, such as two cameras, providing images covering different fields of view of an environment. Each image sensor may be configured to capture images using an adjustable exposure time. An exposure time control unit may be provided that may be configured to determine, for each image sensor, one or more brightness parameters from image data provided by one of the image sensors. The exposure time control unit may be further configured to control the exposure times of the image sensors such that one or more brightness parameters may be determined for a first image sensor at least approximately matching one or more corresponding brightness parameters determined for a second image sensor.

Also described is a method performed by the system for generating surround view images, whereby at least two image sensors may be used for providing images covering different fields of view. In one example, the method performed by the system may include capturing images with each image sensor using an adjustable exposure time and adjusting the exposure times. Adjusting the exposure times may include determining, for each image sensor, one or more brightness parameters from image data provided by a respective image sensor and controlling the exposure times of the image sensors such that the brightness parameter(s) determined for a first image sensor at least approximately matches one or more corresponding brightness parameters determined for a second image sensor.

Other systems, methods, features and advantages may be, or may become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The BAS may be better understood with reference to the following drawings and description. The components in the figures are not necessarily to scale, emphasis instead being placed upon illustrating the principles of the BAS. Moreover, in the figures, like referenced numerals designate corresponding parts throughout the different views.

DETAILED DESCRIPTION

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. One or more functional blocks or units may also be implemented in a common circuit, chip, circuit element or unit.

An example of a brightness adjustment system (BAS) that can be used in conjunction with a surround view system for an automobile is described in the following with reference to the drawings.

Figure 1:
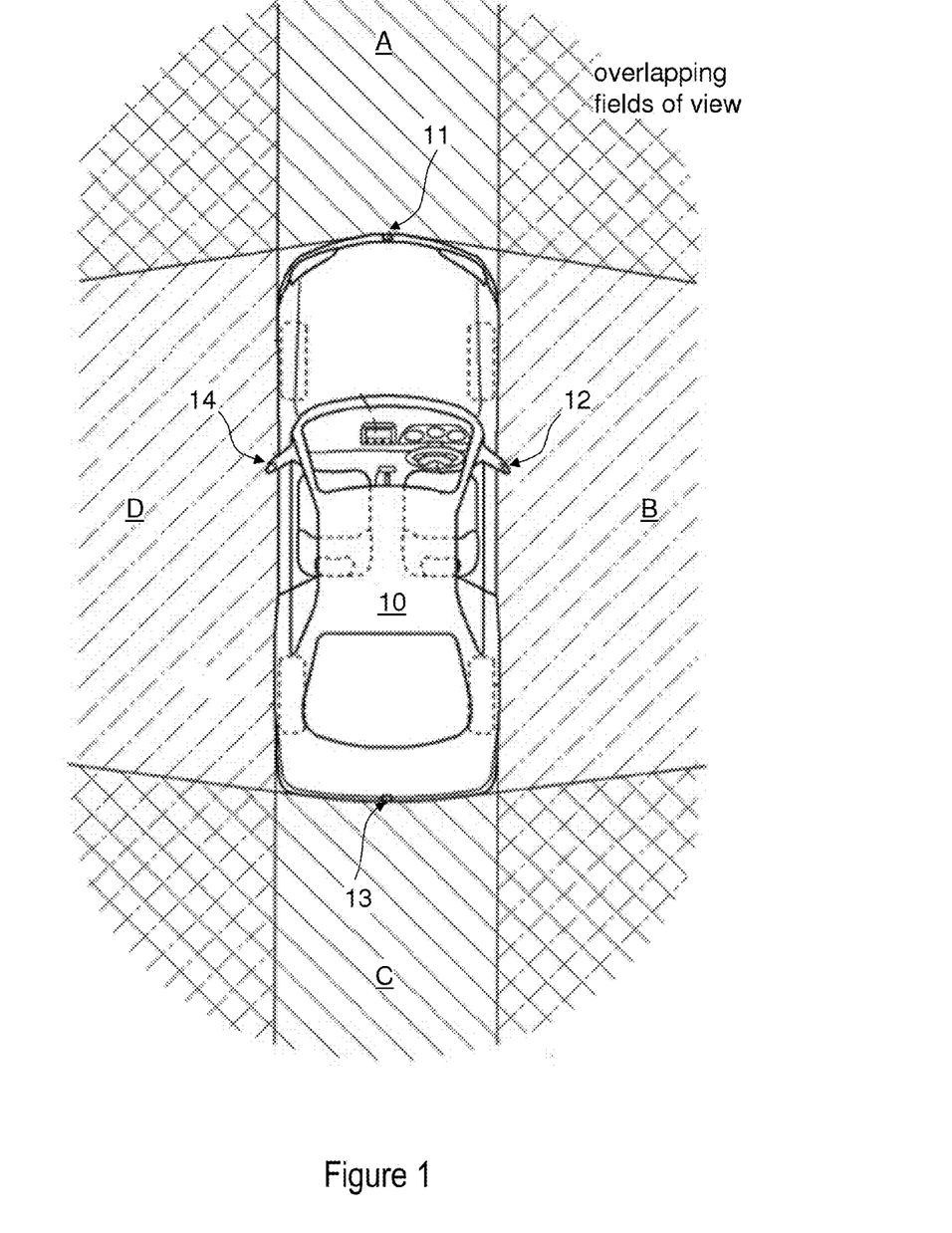
FIG. 1 illustrates an example BAS including four example image sensors arranged on an example vehicle.

FIG. 1 illustrates an example top view of an example vehicle 10 including a plurality of image sensors 11, 12, 13, and 14 (which could be one or more cameras) for monitoring the surroundings of the vehicle. The image sensors may be equipped with a wide angle lens (such as an ultra-wide angle lens or a fish lens) to achieve a wide field of view. In the present example a front image sensor 11, two side image sensors 12 and 14, and a rear image sensor 13 may be provided at the vehicle 10, whereby fields of view (e.g., fields of view A, B, C, D in FIG. 1) of the image sensors may cover a different part of the vehicle's surroundings. The image sensors may be configured in such a manner that the fields of view of two adjacent (neighboring) image sensors overlap. The respective fields of view B and D of the side image sensors 12 and 14 are illustrated in FIG. 1 by the areas hatched with dash-dotted lines, whereas the respective fields of view A and C of the front and rear image sensors 11 and 13 are illustrated by the areas hatched with solid lines. The overlapping part of two fields of view has both hatch patterns. The image sensor devices may include, for example, a charge-coupled device (CCD) and/or a complementary metal-oxide-semiconductor (CMOS) image sensor and suitable lenses.

The front image sensor 11 may be arranged, for example, at a front part of the vehicle 10 to provide an image of the area A extending to the front of the vehicle. The side image sensors 12 and 14 may be arranged at a side minor of the vehicle 10 to provide images of the areas B and D extending to the right and left of the vehicle, respectively. The rear image sensor may be arranged to capture a view of the area D extending to the rear of the vehicle 10. As shown in FIG. 1, the views captured by two neighboring image sensors overlap, and marginal regions of the images provided by two neighboring image sensors (e.g., image sensors 11 and 12, image sensors 12 and 13, image sensors 13 and 14, and image sensors 14 and 11) cover substantially similar segments of the vehicle's surroundings.

Figure 2:
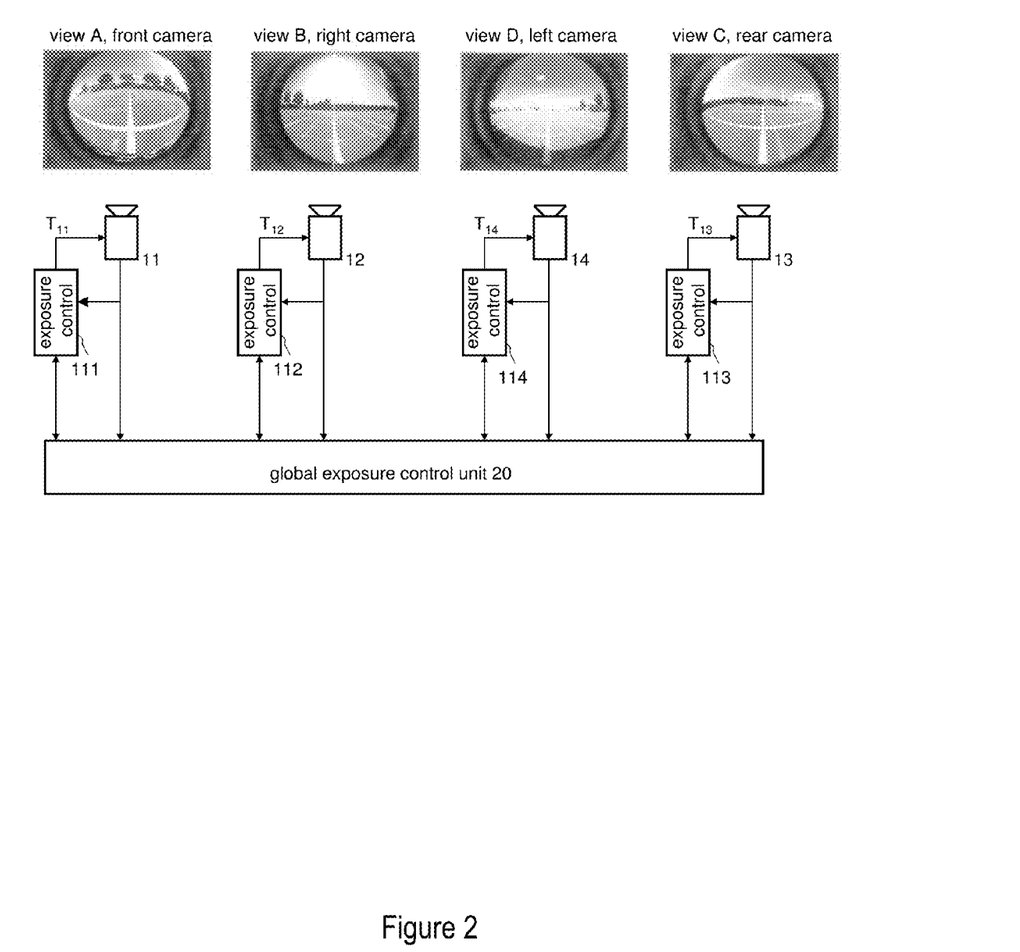
FIG. 2 illustrates an example exposure time control for example image sensors of an example BAS.

FIG. 2 illustrates an example common (or "global") exposure time control that may be applied to the image sensors 11, 12, 13, and 14. As mentioned, similar regions of a surrounding area (e.g., regions where the fields of view of two image sensors overlap) may appear with different brightness on images captured by two adjacent image sensors when using similar exposure times. This may be particularly the case when the sun is shining and, as a result, the image sensors that are facing the sun provide images with a higher brightness than those image sensors that face a shadow casted by the vehicle. When the images are stitched together to one overall image, abrupt brightness changes may be visible in image regions of transition between two individual images. For example, the positions where the individual images have been stitched together may be visible and may be undesired for the user of the surround view system. To limit this issue the following techniques may be used.

By one aspect of the BAS, exposure times of the individual image sensors may be adjusted such that one or more brightness parameters determined for an image sensor match one or more corresponding brightness parameters determined for an adjacent image sensor. For this disclosure, two image sensors are regarded as adjacent when their respective fields of view partially overlap, as illustrated in FIG. 1. Those parts of the images captured by two adjacent image sensors that represent overlapping substantially similar regions may also be referred to as corresponding marginal regions of the two respective images.

Figure 3:
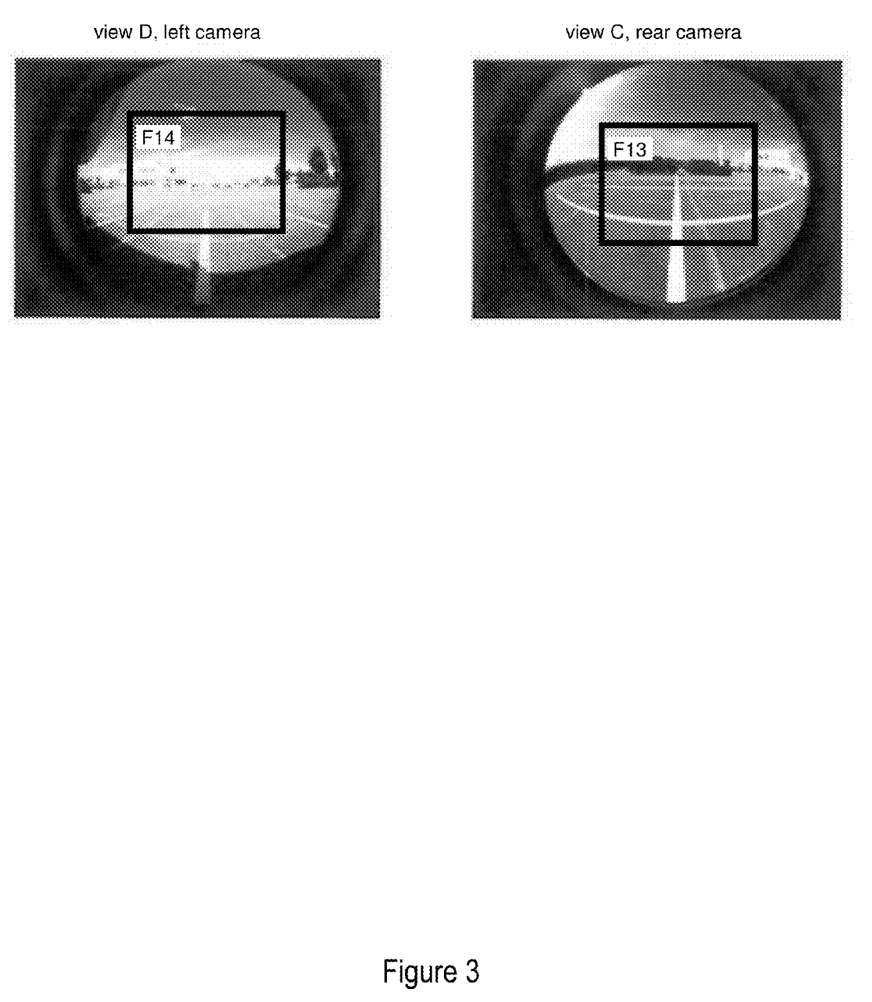
FIG. 3 illustrates an example of determining a brightness parameter by averaging.

A brightness parameter, which may be determined for each individual image sensor, may represent a brightness value of one or more pixels of one image captured by the respective image sensor, such as a numeric value measured for each individual pixel of a captured image. For example, a brightness parameter for image sensor 13 may be determined by averaging brightness of pixels that may be located within a defined sub-image of the image captured by the image sensor. In the illustration of FIG. 3, this sub-image is denoted as frame F13. The same situation is shown for the left image sensor 14. To summarize the function of the exposure time control unit 20 illustrated in FIG. 2, the exposure times of the image sensors 11, 12, 13, and 14 may be adjusted such that the brightness parameter(s) determined for the individual image sensors 11, 12, 13, and 14 are approximately equal (e.g., the average brightness of the pixels within the respective frames F11, F12, F13, and F14 are approximately equal).

The adjustment of the brightness parameter(s) results in images that have approximately equal average brightness values. Additional image processing of transitions between the individual images can be done according to the following process, for example. The brightness of the captured images may be manipulated using interpolated gray scale images (such as gray wedges) to change the pixel values (e.g., the brightness of the pixels) such that brightness of pre-defined image regions in the marginal regions of each image matches the brightness of substantially corresponding image regions of corresponding marginal regions of adjacent images, as illustrated in FIG. 4.

The following refers to the brightness change of the image A provided by the front image sensor 11. However, the same procedure may be also applicable for the images provided by the other image sensors 12, 13, and 14, for example. As illustrated in FIG. 4, brightness values may be calculated which represent the brightness, such as average brightness, of the image regions IA1, IA2, IA3, and IA4 located in the marginal region of the image A provided by the front image sensor 11. The brightness values of the substantially corresponding image regions IB1 and IB2 in the marginal region of the image B associated with right image sensor and the image regions ID3 and ID4 in the marginal region of the image D associated with left image sensor may be determined. It should be noted that each substantially corresponding pair of image regions, e.g., IA1 and IB1, IA2 and IB2, IA3 and ID3, and IA4 and ID4, represent a substantially similar region of the surrounding area.

For each one of the considered image regions IA1, IA2, IA3, and IA4, a corresponding local brightness correction factor IA1', IA2', IA3', and IA4' may be calculated. The local brightness correction factors may be calculated such that the changed images have approximately the same local brightness value (e.g., average brightness value) in substantially corresponding image regions IA1 and IB1, IA2 and IB2, IA3 and ID3, and IA4 and ID4. In this example, four local correction factors may be determined for each image. Based on the calculated correction factors (IA1', IA2', IA3', IA4' for the image A) a gray scale image A' (such as a two-dimensional gray wedge) can be calculated using bilinear interpolation, for example. This gray scale image A' can be used to scale the brightness values composing the image A. The same procedure may be performed for each image A, B, C, and D provided by the respective image sensors, 11, 12, 13, and 14.

Figure 4:
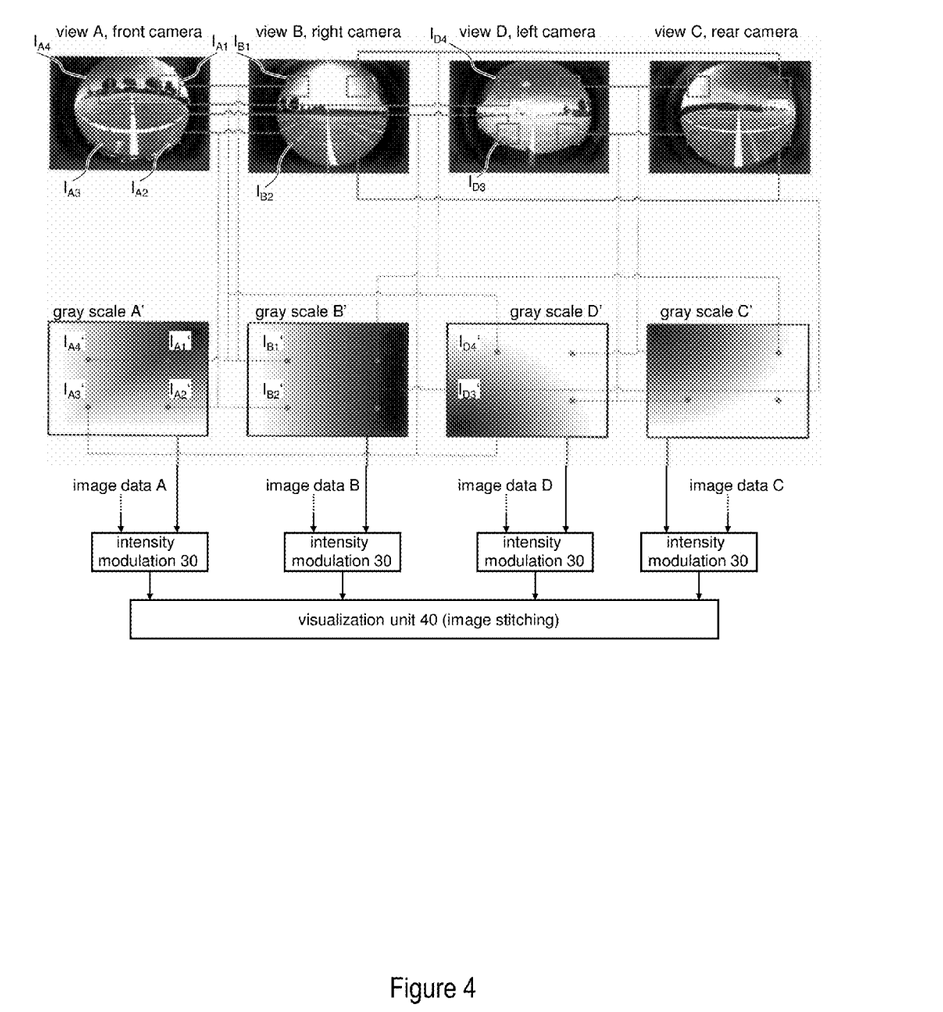
FIG. 4 illustrates an example of brightness adjustment and image stitching.

In FIG. 4, this scaling may be performed by the intensity modulation unit 30, which may determine a product of the image A and the corresponding gray scale image A'. Analogous calculations may be made for the other images. The resulting brightness changed images may be provided to a visualization unit 40 that performs an image stitching algorithm without brightness adjustment.

Some aspects of the BAS described herein are summarized in reference to the FIGS. 1, 2 and 4. It should be understood, however, that the list below is not exhaustive and covers merely some example features of the BAS system.

A BAS of a surround view system may cover a 360 degree panorama view, and panorama images may be provided based on images captured by at least two image sensors (e.g., image sensors 11 to 14 in FIGS. 1 and 2), whereby the images of different image sensors cover different fields of view (e.g., views A to D in FIGS. 2 and 4) of an environment. Each image sensor 11, 12, 13, and 14 may be configured to capture images A, B, C, and D using an adjustable exposure time T11, T12, T12, and T14, respectively. Furthermore, an exposure time control unit 20 may be configured to determine, for each image sensor 11, 12, 13, and 14, one or more brightness parameters from image data provided by a respective image sensor. The exposure time control unit 20 may be further configured to control the exposure times of the individual image sensors 11, 12, 13, and 14, such that the brightness parameter(s) determined for a first image sensor (e.g., image sensor 11) at least approximately match one or more corresponding brightness parameters determined for at least a second image sensor (e.g., image sensor 12, 13, or 14). The brightness parameters may represent the average brightness of one or more sub-images of the images.

The BAS may further include an intensity modulation unit 30 which may be configured to adjust the brightness of each image A, B, C, and D locally in such a manner that, after the adjustment, local brightness values calculated for substantially corresponding image regions (e.g., regions IA1 and IB1 in FIG. 4) of images provided by two adjacent image sensors (e.g., image sensor 11 and 12) at least approximately match. The local brightness value may be calculated by averaging the brightness of the pixels located within the mentioned image regions (e.g., by calculating the average brightness of regions IA1, IA2, etc.). Two substantially corresponding image regions (e.g., regions IA1 and IB1) of images (e.g., images A and B) provided by two adjacent image sensors (e.g., image sensors 11 and 12) may be located in marginal regions of the respective images and represent the same or substantially similar part of the surrounding area. In accordance with one example implementation, gray scale images A', B', C', and D' may be provided for locally adjusting the brightness of the images A, B, C, and D, respectively, by modulating the images A, B, C, and D with corresponding gray scale images A', B', C', and D'. The gray scale images A', B', C', and D' may be calculated using interpolation and previously determined local brightness correction factors, which may be calculated for defined image regions (e.g., IA1-IA4, IB1-IB4, etc.) located in the marginal regions of the images. The brightness correction factors may be calculated such that, after the change, local brightness values calculated for substantially corresponding image regions of images provided by two adjacent image sensors at least approximately match. A visualization unit 40 may be provided for stitching the intensity modulated images provided by the image sensors together to generate one surround view image.

Another aspect of the BAS system relates to a method for generating surround view images, whereby at least two image sensors (e.g., image sensors 11 to 14 in the example of FIG. 1) may be used for providing images covering different fields of view (e.g., views A to D in FIGS. 1, 2, and 4). In accordance with one example of the BAS system, the method may include capturing images A, B, C, or D with each image sensor 11, 12, 13, and 14 using an adjustable exposure time T11, T12, T13, and T14, respectively. Adjusting the exposure times T11, T12, T13, and T14 may include determining, for each image sensor, one or more brightness parameters from image data provided by the respective image sensor, and controlling the exposure times T11, T12, T13, and T14 of the individual image sensors 11, 12, 13, and 14 such that the brightness parameter(s) determined for an image sensor at least approximately matches the corresponding brightness parameter(s) determined for an adjacent image sensor.

The method may further include adjusting the brightness of each image (e.g., images A to D of FIG. 4) locally in such a manner that, after the adjustment, local brightness values calculated for substantially corresponding image regions (e.g., see FIG. 4 regions IA1 and IB1) of images provided by two adjacent image sensors (e.g., image sensors 11 and 12) at least approximately match. Two substantially corresponding image regions of images provided by two adjacent image sensors may be located in marginal regions of the respective images and represent the same portion of a surrounding view. In accordance with one example, local brightness correction factors may be determined for defined image regions (e.g., IA1, IB1, etc.) located in the marginal regions of the images. The brightness correction factors may be calculated such that, after the adjustment, local brightness values, which can be calculated for substantially corresponding image regions of images provided by two adjacent image sensors, at least approximately match. Further, gray scale images A', B', C', and D' may be calculated for locally adjusting the brightness of the image A, B, C, and D, respectively, using interpolation and the previously determined local brightness correction factors. The image provided by the respective image sensor and the corresponding gray scale image may be then modulated for adjusting the brightness.

In accordance with one example implementation, the calculation of a brightness parameter for an image region (e.g., region IA1) of a first image (e.g., image A) may include calculating a brightness parameter for the substantially corresponding image region (e.g., region IB1) of a second image (e.g., image B) provided by an adjacent image sensor, and calculating the local brightness correction factor for the two substantially corresponding image regions (e.g., IA1 and IB1) such that the corresponding products of correction factors and brightness parameter may be approximately equal.

Figure 5:
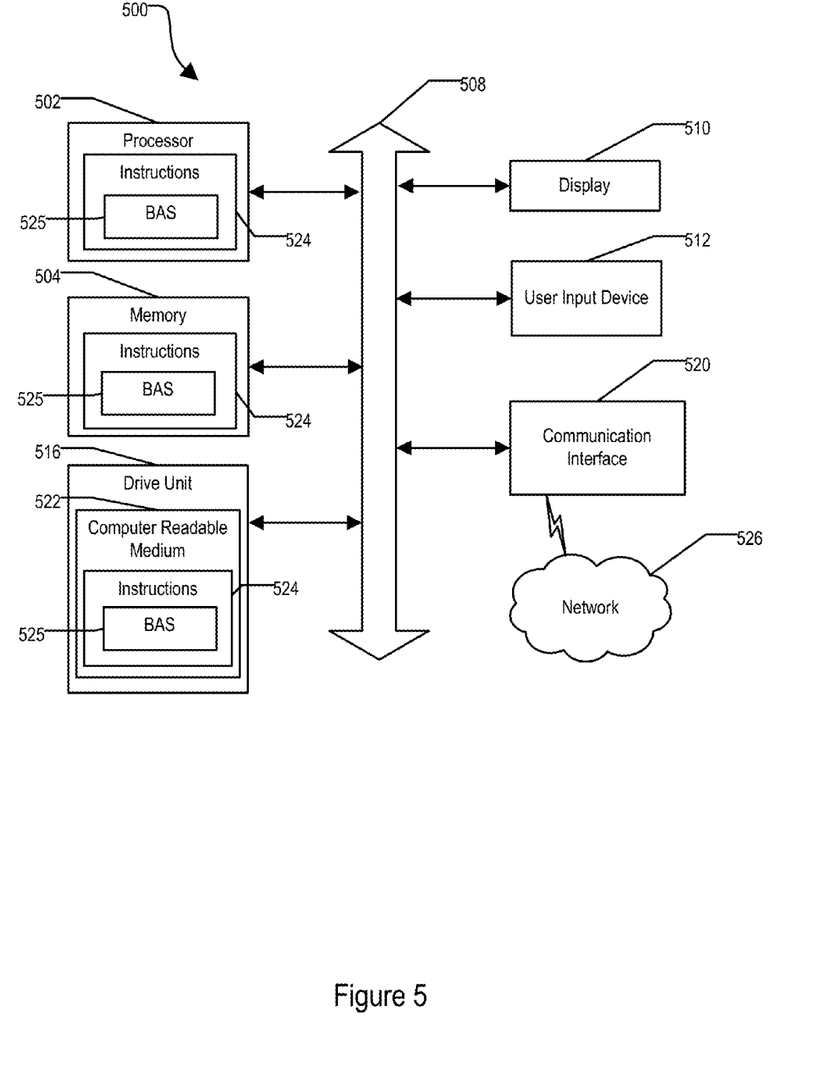
FIG. 5 illustrates a block diagram of an example computer system that may be included or used with an aspect of an example BAS.

Furthermore, the BAS, one or more aspects of the BAS, or any other device or BAS operating in conjunction with the BAS may include a portion or all of one or more computing devices of various kinds, such as the computer system 500 in FIG. 5. The computer system 500 may include a set of instructions that can be executed to cause the computer system 500 to perform any one or more of the methods or computer based functions disclosed herein. The computer system 500 may operate as a standalone device or may be connected, such as, using a network, to other computer systems or peripheral devices.

The computer system 500 may be implemented using electronic devices that provide voice, audio, video or data communication. While a single computer system 500 is illustrated, the term "system" may include any collection of systems or sub-systems that individually or jointly execute a set, or multiple sets, of instructions to perform one or more computer functions.

The computer system 500 may include a processor 502, such as a central processing unit (CPU), a graphics processing device (GPU), a digital signal processor, or some combination of different or the same processors. The processor 502 may be a component in a variety of systems. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually or programmed.

The term "module" may be defined to include a plurality of executable modules. The modules may include software, hardware, firmware, or some combination thereof executable by a processor, such as processor 502. Software modules may include instructions stored in memory, such as memory 504, or another memory device, that may be executable by the processor 502 or other processor. Hardware modules may include various devices, components, circuits, gates, circuit boards, and the like that are executable, directed, or controlled for performance by the processor 502.

The computer system 500 may include a memory 504, such as a memory 504 that can communicate via a bus 508. The memory 504 may be a main memory, a static memory, or a dynamic memory. The memory 504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 504 includes a cache or random access memory for the processor 502. In alternative examples, the memory 504 may be separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described may be performed by the programmed processor 502 executing the instructions stored in the memory 504. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system 500 may be in communication with, may include, or may not further include a display device 510, such as a liquid crystal display (LCD), an organic light emitting diode (OLED), a flat panel display, a solid state display, a cathode ray tube (CRT), a projector, a printer or other now known or later developed display device for outputting determined information. The display 510 may act as an interface for the user to see the functioning of the processor 502, or specifically as an interface with the software stored in the memory 504 or in the drive device 516.

The computer system 500 may include an input device 512 configured to allow a user to interact with any of the components of computer system. The input device 512 may be a keypad, a keyboard, or a cursor control device, such as a mouse, or a joystick, touch screen display, remote control or any other device operative to interact with the computer system 500. For example, a user of a navigation system may input criteria or conditions to be considered by a navigation device in calculating a route using the input device 512.

The computer system 500 may include a disk or optical drive device 516. The disk drive device 516 may include a computer-readable medium 522 in which one or more sets of instructions 524 or software can be embedded. The instructions 524 may embody one or more of the methods or logic described herein, including aspects of the BAS 525. The instructions 524 may reside completely, or partially, within the memory 504 or within the processor 502 during execution by the computer system 500. The memory 504 and the processor 502 also may include computer-readable media as discussed above.

The computer system 500 may include computer-readable medium that includes instructions 524 or receives and executes instructions 524 responsive to a propagated signal so that a device connected to a network 526 can communicate voice, video, audio, images or any other data over the network 526. The instructions 524 may be transmitted or received over the network 526 via a communication port or interface 520, or using a bus 508. The communication port or interface 520 may be a part of the processor 502 or may be a separate component. The communication port 520 may be created in software or may be a physical connection in hardware. The communication port 520 may be configured to connect with a network 526, external media, the display 510, or any other components in the computer system 500, or combinations thereof.

The term "computer-readable medium" may include a single storage medium or multiple storage media, such as a centralized or distributed database, or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In alternative examples, dedicated hardware implementations, such as application specific integrated circuits, programmable logic arrays and other hardware devices, may be constructed to implement various aspects of the BAS. One or more examples described may implement functions using two or more specific interconnected hardware modules or devices with related control and data signals that can be communicated between and through modules, or as portions of an application-specific integrated circuit. The BAS may encompass software, firmware, and hardware implementations.

The BAS described may be implemented by software programs executable by a computer system. Implementations can include distributed processing, component/object distributed processing, and parallel processing. Alternatively, virtual computer system processing can be constructed to implement various aspects of the BAS.

To clarify the use in the pending claims and to hereby provide notice to the public, the phrases "at least one of "<A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the BAS system have been described, it may be apparent to those of ordinary skill in the art that many more embodiments and implementations are possible within the scope of the invention. For example, much of the above description presents aspects utilized by brightness adjustment systems of vehicle surround view systems; however, other types of systems may utilize these aspects and other aspects of the BAS system as well. Accordingly, the invention is not to be restricted except in light of the attached claims and their equivalents.

We claim:

1. A system comprising:
    a first image sensor and a second image sensor configured to capture images using an adjustable exposure time, the captured images covering different fields of view;
    an exposure time control unit including first instructions executable by a processor to:
        determine, for the first image sensor, one or more brightness parameters from the captured images;
        determine one or more corresponding brightness parameters for the second image sensor, the second image sensor being adjacent to the first image sensor; and
        control exposure times of the first image sensor, such that the one or more brightness parameters at least approximately match the one or more corresponding brightness parameters determined for the second image sensor; and
    an intensity modulation unit including second instructions executable by the processor to adjust brightness of the captured images using digital image processing according to the one or more corresponding brightness parameters determined for the second image sensor, such that brightness values of the captured images for corresponding regions at least approximately match, the corresponding regions being located in marginal regions of the captured images, the marginal regions being substantially similar regions of a surrounding view.

2. The system of claim 1, where the first and the second image sensors are arranged such that respective fields of view of the first and the second image sensors overlap.

3. The system of claim 1, where, for the first and the second image sensors, the one or more corresponding brightness parameters represent average brightness of one or more sub-images of the captured images, and wherein the intensity modulation unit is configured to adjust brightness of images that are captured after the exposure times of the first image sensor are controlled such that the one or more brightness parameters at least approximately match the one or more corresponding brightness parameters determined for the second image sensor.

4. The system of claim 1, where the intensity modulation unit is further configured to calculate, for the first and the second image sensors, a gray scale image for locally adjusting the brightness of the captured images provided by respective image sensors, the gray scale image being calculated using interpolation and predetermined local brightness correction factors that are calculated for defined image regions located in the marginal regions of the captured images.

5. The system of claim 4, where the intensity modulation unit is further configured to modulate the captured images by the gray scale image to generate corresponding intensity modulated captured images.

6. The system of claim 4, where the intensity modulation unit is further configured to determine the gray scale image using bilinear interpolation between predetermined local brightness correction factors.

7. The system of claim 4, wherein the predetermined local brightness correction factors are calculated such that, after correction, local brightness values calculated for corresponding regions of images captured by two adjacent image sensors at least approximately match.

8. The system of claim 1, further comprising a visualization unit configured to stitch the captured images together to generate a surround view image without performing a brightness adjustment.

9. A method comprising:
    determining with a processor, for a first image sensor of at least two image sensors, one or more brightness parameters from a first captured image provided by the first image sensor;
    determining, with the processor, for a second image sensor of the at least two image sensors, one or more corresponding brightness parameters from a second captured image provided by the first image sensor, the second captured image being adjacent to the first captured image;
    controlling exposure times of the first image sensor with the processor so that the one or more brightness parameters at least approximately match the determined one or more corresponding brightness parameters of the second captured image provided by the second image sensor of the at least two image sensors; and
    adjusting brightness of the first and the second captured images with the processor using digital image processing according to the determined one or more corresponding brightness parameters of the second image sensor such that brightness values calculated for substantially corresponding regions of the first and the second captured images at least approximately match, where the corresponding regions are located in marginal regions that represent substantially similar regions of a surrounding view.

10. The method of claim 9, where the first and the second captured images at least partially overlap.

11. The method of claim 9, where the determining of the one or more brightness parameters includes calculating average brightness of one or more sub-images of the first captured image.

12. The method of claim 9, further comprising:
    determining, with the processor, brightness correction factors for defined image regions located in the marginal regions;
    calculating a gray scale image for adjusting the brightness of the first and the second captured images using interpolation and the determined brightness correction factors; and
    modulating the first and the second captured images based on the gray scale image, the brightness correction factors calculated such that, after modulation, brightness values for corresponding regions of captured images provided by two adjacent image sensors at least approximately match.

13. The method of claim 9, further comprising stitching the first and the second captured images together with the processor to generate one surround view image.

14. The method of claim 9, further comprising:
calculating, with the processor, a brightness parameter for a region of the first captured image;
calculating a brightness parameter for a substantially corresponding region of the second captured image with the processor; and
calculating a brightness correction factor for the two corresponding regions with the processor such that corresponding products of a brightness correction factor and each of the brightness parameters for the two corresponding regions are approximately equal.

15. A method comprising:
sensing a first image and a second image at a first image sensor and a second image sensor, respectively to generate a first captured image and a second captured image sensed from the first image sensor and the second image sensor, respectively, the first image sensor being adjacent to the second image sensor;
determining, via a processor communicatively coupled to the first image sensor and the second image sensor, one or more respective brightness parameters of each of the first captured image and the second captured image;
determining exposure times for the first image sensor and the second image sensor with the processor based on the determined one or more respective brightness parameters for the first captured image and the second captured image, such that the one or more respective brightness parameters at least approximately match; and
adjusting the one or more respective brightness parameters using digital image processing, such that corresponding brightness values of the first captured image and the second captured image match.

16. The method of claim 15, where the first captured image and the second captured image cover different fields of view.

17. The method of claim 15, where the first captured image and the second captured image at least partially overlap.

18. The method of claim 15, where, for the first captured image and the second captured image, the one or more respective brightness parameters include average brightness of one or more respective sub-images of the first and the second captured images.

19. The method of claim 15, further comprising calculating, via the processor, for the first and the second captured images, a gray scale image with adjusted brightness using interpolation and determined brightness correction factors that are calculated for defined image regions located in marginal regions of the first and the second captured images.

20. The method of claim 19, further comprising modulating, via the processor, the first and the second captured images by the gray scale image to generate corresponding intensity modulated images.

21. The method of claim 15, further comprising determining, via the processor, for the first and the second captured images, gray scale images using bilinear interpolation between determined local brightness correction factors.

* * * * *